United States Patent [19]

Morrisson

[11] Patent Number: 5,395,139
[45] Date of Patent: Mar. 7, 1995

[54] SWIVEL TYPE ADAPTER PIPE FITTING FOR SPRINKLER OR DRIP-TYPE IRRIGATION SYSTEMS

[75] Inventor: Richard E. Morrisson, Salt Lake County, Utah

[73] Assignee: Pro-Mark, Inc., Bountiful, Utah

[21] Appl. No.: 83,301

[22] Filed: Jun. 29, 1993

[51] Int. Cl.⁶ ............................................. F16L 55/00
[52] U.S. Cl. ...................................... 285/5; 285/132; 285/278; 285/319; 285/330; 285/921
[58] Field of Search .................. 285/921, 5, 922, 319, 285/132, 278, 281, 330, 12, 302, 150, 151

[56] References Cited

U.S. PATENT DOCUMENTS

| 2,423,069 | 6/1947 | McElhose et al. | 285/330 X |
| 2,602,003 | 7/1952 | Wellborn | 285/151 X |
| 3,552,778 | 1/1971 | Muller | 285/151 X |
| 3,623,753 | 11/1971 | Henry | 285/330 |
| 4,128,264 | 12/1978 | Oldford | 285/41 |
| 4,772,051 | 9/1988 | Mann | 285/150 X |
| 5,251,938 | 10/1993 | Ericksen | 285/921 X |

*Primary Examiner*—Dave W. Arola
*Attorney, Agent, or Firm*—Mallinckrodt & Mallinckrodt

[57] ABSTRACT

Adapter pipe fittings for sprinkler or drip-type irrigation systems are improved by providing a two piece pipe fitting, a manifold piece that snaps into a body piece and swivels therein. Such adapter pipe fittings are often required to be installed adjacent to a sidewalk, wall, fence, or other like obstruction whereby there is restricted clearance especially if the pipe fittings has laterally projecting offtake connector members extending therefrom. The fitting is especially well adapted for installation at sites where there is restricted clearance because the body piece can swivel about the manifold piece and the manifold piece is therefore not required to turn while the adapter pipe fitting body piece is being screwed onto an underground piping system.

14 Claims, 1 Drawing Sheet

SWIVEL TYPE ADAPTER PIPE FITTING FOR SPRINKLER OR DRIP-TYPE IRRIGATION SYSTEMS

BACKGROUND OF THE INVENTION

1. Field

The invention is in the field of adapter pipe fittings as intended primarily for use in sprinkler or underground drip-type irrigation systems.

2. State of the Art

Adapter pipe fittings of the general type with which the invention is concerned are well known and commonly used in sprinkler and underground drip-type irrigation systems for gardens and lawns. They are often of manifold type having a plurality of offtakes at intervals along their lengths or circumferentially. One problem with such manifold type pipe fittings is that they are frequently installed adjacent to a sidewalk, a fence, a wall, or another such obstruction where there is only limited clearance for screwing the adapter pipe fitting onto the underground piping system, especially if the pipe fitting includes offtake connector members projecting laterally therefrom.

SUMMARY OF THE INVENTION

In the making of the present invention, it was a principal objective to improve existing adapter pipe fittings of the type concerned so that they could be easily installed where there is limited clearance.

To this end, a novel feature of the invention is the provision of a two piece adapter pipe fitting having a body piece and a manifold piece which are rotatable with respect to one another and whereby the fitting can be installed where there is inadequate clearance to permit usual rotation of the manifold. In such situation, the manifold piece can be placed in the desired position and the body piece rotated relative thereto as it is screwed onto the threaded end of an irrigation water supply line.

The body piece has a flow passage therethrough and an end portion of reduced internal diameter which defines a shoulder disposed circumferentially about the flow passage within such body piece and the manifold piece is snapped into the end portion of the body piece. The manifold piece has a flow channel therethrough communicating with the flow channel of the body piece and a plurality of offtake connector members projecting laterally therefrom and with flow passages therethrough communicating with the flow channel of the manifold piece. The manifold piece has an elongate, resilient, snap-in end portion of reduced outside diameter such as to be rotatably received by the reduced internal diameter portion of the flow passage through the body piece. The snap-in end portion is preferably split longitudinally for snap-in purposes and has a headed end for engaging the shoulder of the flow channel of the body piece when snapped into place in the body piece. The manifold piece is adapted to swivel in place in its snapped-in position within the body piece. To prevent leakage of water between the two separate pieces, there is also provided sealing means such as an O-ring interposed between the snap-in end portion of the manifold piece and the receiving end portion of the body piece.

THE DRAWING

The best mode presently contemplated for carrying out the invention in actual practice is illustrated in the accompanying drawing, in which:

FIG. 1 is a perspective view of an adapter pipe fitting of the invention having a plurality of offtake connector fittings for use between an irrigation water supply line and a sprinkler head, the fitting being shown as adjusted for installation in a confined space by rotation of the body piece relative to the manifold piece;

FIG. 2, a view in side elevation of the fitting looking from the left toward the right in FIG. 1, but showing the fitting with the two pieces interconnected for installation where there is adequate space; and FIG. 3, a view corresponding to that of FIG. 2, but partially in vertical axial section through the body piece of the fitting.

DETAILED DESCRIPTION OF THE ILLUSTRATED EMBODIMENT

Figure 1:
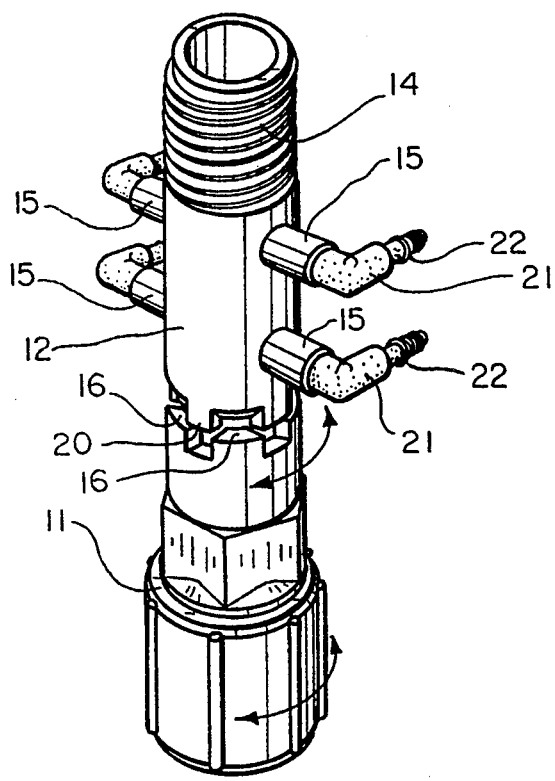

The illustrated embodiment of adapter pipe fitting 10 shows how the invention is applied to an adapter pipe fitting of common type. In accordance with the invention, such pipe fitting 10 has separate, elongate, pipe pieces 11 and 12 the piece 11 being here designated the body piece and the piece 12 being here designated the manifold piece or extension piece and these two rectilinearly interconnected pieces being adapted to conduct flow of pressure irrigation water from a source of same to a series of offtakes for underground irrigation and to a conventional sprinkler head. For this purpose, body piece 11 has an internally threaded socket end 13 for connection with an irrigation water supply line (not shown) and manifold piece 12 has an externally threaded end 14 onto which a usual sprinkler head (not shown) is to be screwed and has, as usual, a plurality (here four) of offtake connector members designated 15, respectively, which project in customary manner at right angles from opposite the sides of such manifold piece 12. Body piece 11 has a flow channel therethrough, as do each of the connector members 15 of the manifold piece 12, all such flow channels being in flow communication with one another.

Figure 3:
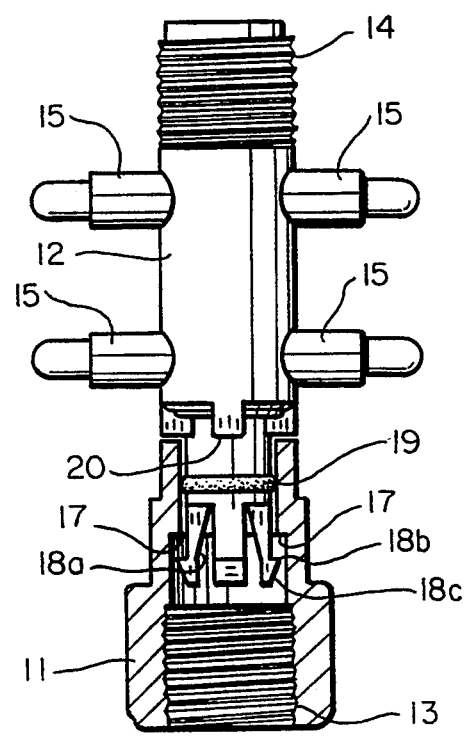

The opposite end 16 of the body piece 11 is of reduced internal diameter so as to define a shoulder 17, FIG. 3, disposed circumferentially about the interior thereof at the termination of the reduced diameter part of the flow passage through such body piece 11. The snap-in end portion 18 of manifold piece 12 that is opposite externally threaded end portion 14 thereof is elongate and resilient and of reduced outside diameter such as to be rotatably received in snap-in manner by the reduced internal diameter portion of the flow passage through body piece 11. The snap-in end portion 18 is of cylindrical configuration, split longitudinally as at 18a, FIG. 3, and having a flange 18b at its terminal end to engage shoulder 17 internally of the flow passage through pipe body piece 11, as illustrated in FIG. 3. Sealing means is interposed between the snap-in end portion of the manifold piece and the body piece. Here, the sealing means is an O-ring 19 installed in a receiving groove for such on the cylindrical snap-in end portion 18 of manifold piece 12 of pipe fitting 10 above the splits 18a, which forms a water-tight seal when snap-in end portion 18 is inserted in the end portion 16 of body piece 11.

The material from which the manifold piece 12 is made is sufficiently resilient, usually a suitable polymer plastic materials to yield as the flanged head 18b of the snap-in end portion 18 is pushed into place through the interior flow passage of the body piece 11. To facilitate entry into and passage of such flanged head of the split snap-in end portion 18 of manifold piece 12 through the interior flow passage of body piece 11, such head end is preferably tapered as illustrated at 18c, FIG. 3.

Figure 2:
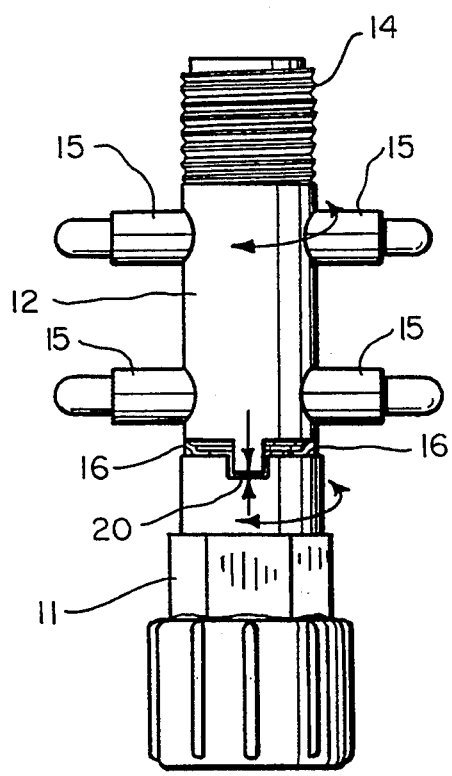

The mating ends of the body piece 11 and of the manifold piece 12 are matingly splined at 20 and 21, respectively, so as to, when interengaged as illustrated in FIG. 2, prevent turning of the pipe body and the manifold relative to each other. Between splines 21 on the manifold piece 12, there is preferably a ridge 22 of plastic material to increase the strength of the fitting at this point.

When the adapter pipe fitting is being installed where there is sufficient clearance, the body piece can be screwed onto the irrigation supply line by grasping and turning the manifold. However, in accordance with the invention, the elongate snap-in end portion 18 of the manifold piece 12 is of sufficient length to allow such snap-in end portion to be pulled outwardly of the body piece 11 so that the splined portions on the body and manifold disengage, as shown in FIG. 1, for installing the adapter pipe fitting in areas of restricted clearance. As so disengaged, the body piece 11 can be screwed onto an irrigation supply line by turning only the body piece without turning the manifold piece.

It may be desirable in some situations to use a fitting of the invention when the offtake connector members on the manifold are not required. For such uses, the manifold piece or extension piece may be provided without the offtake connectors.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An adapter pipe fitting for sprinkler or drip-type irrigations systems, comprising:
   a body piece having a flow passage therethrough and opposite end portions;
   a manifold piece having a flow passage therethrough and opposite end portions, the said manifold piece having at least one offtake connector member projecting laterally therefrom with a flow passage therethrough communicating with said flow passage of said manifold piece;
   means rotatably interconnecting one end portion of the manifold piece with one end portion of the body piece, the interconnected pieces being adapted to rotate relative to one another in the installed position of the adapter pipe fitting; and
   means on the free end of the body piece for screwing the body piece to an irrigation water supply line.

2. An adapter pipe fitting for sprinkler or drip-type irrigation systems according to claim 1, wherein the end portion of the body piece with which the one end portion of the manifold piece is connected is of reduced internal diameter which defines a shoulder disposed circumferentially about said flow passage within said body piece, and wherein said one end of the manifold piece is of reduced diameter, elongate, and resilient, so as to snap into said end portion of said body piece, and be rotatably received thereby, said snap-in one end portion of the manifold piece being split longitudinally for snap-in purposes and terminating in a headed end for engaging said shoulder of the flow passage of said body piece when snapped into place therein.

3. An adapter pipe fitting for sprinkler or drip-type irrigation systems according to claim 2, further comprising:
   sealing means interposed between said snap-in one end portion of the manifold piece and the body piece.

4. An adapter pipe fitting according to claim 3, wherein the sealing means is an O-ring and the snap-in end portion has a groove about its circumference for the insertion of said O-ring.

5. An adapter pipe fitting according to claim 1, wherein the means on the free end of said body piece for screwing the body piece to an irrigation water supply line is an internally threaded socket end.

6. An adapter pipe fitting according to claim 1, wherein the free end of said manifold piece is externally threaded.

7. An adapter pipe fitting for sprinkler or drip-type irrigation systems, comprising:
   a body piece having a flow passage therethrough and opposite end portions, one end portion being of reduced internal diameter to define a shoulder disposed circumferentially about said flow passage within said body piece;
   a manifold piece having a flow passage therethrough and opposite end portions, one end portion thereof being of reduced diameter, elongate, and resilient, so as to snap into said one end portion of said body piece, and be rotatably received thereby, said snap-in one end portion of the manifold piece being split longitudinally for snap-in purposes and terminating in a headed end for engaging said shoulder of the flow passage of said body piece when snapped into place therein, so that the flow passages through said pieces communicate, the said manifold piece having at least one offtake connector member projecting laterally therefrom with a flow passage therethrough communicating with said flow passage of said manifold piece, and
   the mating ends of the body piece and of the manifold piece, respectively, being matingly splined to normally prevent turning of said body piece and said manifold piece relative to each other, and wherein the elongate snap-in one end portion of the manifold piece is of sufficient length to allow such snap-in one end portion to move outwardly of the body piece so that the splined portions on said body piece and said manifold piece become disengaged to allow rotation of body piece relative to the manifold piece.

8. An adapter pipe fitting according to claim 7, wherein the manifold piece has a plurality of offtake connector members.

9. An adapter pipe fitting for sprinkler or drip-type irrigation systems, comprising:
   an adapter pipe body piece with a flow channel therethrough, said body piece having an end portion of reduced internal diameter which defines a shoulder disposed circumferentially about the interior of said flow passage;

a manifold piece snapped into said end portion of said body piece and having a flow channel therethrough communicating with said flow channel of said body piece, a plurality of offtake connector members projecting laterally from said manifold piece and, with respective flow passages therethrough, each communicating with said flow channel of said manifold piece, said manifold piece having an elongate, resilient, snap-in end portion of reduced outside diameter such as to be rotatably received by the reduced internal diameter portion of said flow passage through said body piece, being split longitudinally for snap-in purposes, and having a headed end for engaging said shoulder of the flow channel of said body piece when snapped into place in said body piece, said snapped-in manifold piece being adapted to swivel in place in its snapped-in position within said body piece, the mating ends of the pipe body piece and of the manifold piece being matingly splined, respectively, to normally prevent turning of said pipe body piece and said manifold piece relative to each other, and the elongate snap-in end portion of the manifold piece being of sufficient length to allow such snap-in end portion to move outwardly of the body piece so that the splined portions on said body piece and manifold piece disengage; and sealing means interposed between said snap-in end portion of the manifold piece and the body piece.

10. An adapter pipe fitting for sprinkler or drip-type irrigations systems, comprising:

a body piece having a flow passage therethrough and opposite end portions;

an extension piece having a flow passage therethrough and opposite end portions; and means rotatably interconnecting one end portion of said extension piece with one end portion of said body piece so that the flow passages through said pieces communicate and so that the extension piece can move outwardly of the body piece a limited distance, the mating ends of the body piece and of the extension piece, respectively, being matingly splined to normally prevent turning of said body piece and said extension piece relative to each other, but to allow the extension piece to move outwardly of the body piece so that the splined portions on said body piece and said extension piece become disengaged to allow turning of said body piece and said extension piece relative to each other.

11. An adapter pipe fitting according to claim 10, wherein the free end of said body piece has an internally threaded socket end.

12. An adapter pipe fitting according to claim 10, wherein the free end of said manifold piece is externally threaded.

13. An adapter pipe fitting for sprinkler or drip-type irrigation systems, comprising:

an adapter pipe body piece with a flow channel therethrough, said body piece having an end portion of reduced internal diameter which defines a shoulder disposed circumferentially about the interior of said flow passage;

an extension piece snapped into said end portion of said body piece and having a flow channel therethrough communicating with said flow channel of said body piece, said extension piece having an elongate, resilient, snap-in end portion of reduced outside diameter such as to be rotatably received by the reduced internal diameter portion of said flow passage through said body piece, being split longitudinally for snap-in purposes, and having a headed end for engaging said shoulder of the flow channel of said body piece when snapped into place in said body piece, said snapped-in extension piece being adapted to swivel in place in its snapped-in position within said body piece, the mating ends of the pipe body piece and of the extension piece being matingly splined, respectively, to normally prevent turning of said pipe body piece and said extension piece relative to each other, and the elongate snap-in end portion of the extension piece being of sufficient length to allow such snap-in end portion to move outwardly of the body piece so that the splined portions on said body piece and extension piece disengage; and sealing means interposed between said snap-in end portion of the extension piece and the body piece.

14. An adapter pipe fitting according to claim 13, wherein the sealing means is an O-ring and the snap-in end portion has a groove about its circumference for the insertion of said O-ring.

* * * * *

UNITED STATES PATENT AND TRADEMARK OFFICE
CERTIFICATE OF CORRECTION

PATENT NO. : 5,395,139
DATED : March 7, 1995
INVENTOR(S) : Richard E. Morrison

It is certified that error appears in the above-identified patent and that said Letters Patent is hereby corrected as shown below:

On the title page, item [75], Inventor's name changed from "Morrisson" to --Morrison--.

Col. 3, line 3, "materials" should be --material,--.

Signed and Sealed this

Third Day of October, 1995

Attest:

BRUCE LEHMAN

Attesting Officer        Commissioner of Patents and Trademarks